US008307111B1

(12) United States Patent
Micalizzi, Jr.

(10) Patent No.: US 8,307,111 B1
(45) Date of Patent: Nov. 6, 2012

(54) SYSTEMS AND METHODS FOR BANDWIDTH SCAVENGING AMONG A PLURALITY OF APPLICATIONS IN A NETWORK

(75) Inventor: Charles Micalizzi, Jr., Capistrano Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 290 days.

(21) Appl. No.: 12/759,316

(22) Filed: Apr. 13, 2010

(51) Int. Cl.
G06F 15/16 (2006.01)
G06F 15/173 (2006.01)
H04W 40/00 (2009.01)
H04W 72/00 (2009.01)

(52) U.S. Cl. ........ 709/232; 709/223; 709/224; 709/225; 709/226; 709/227; 709/228; 709/229; 709/230; 709/231; 709/233; 709/234; 709/235; 709/236; 709/237; 709/238; 370/321; 370/458; 370/350; 370/324; 370/330; 370/337; 370/338; 370/510; 370/512; 370/328; 370/322; 370/347; 370/406; 370/468; 370/442; 455/451; 455/445; 455/452.2; 455/453; 455/448; 455/465; 455/446; 455/447; 455/449; 455/450; 455/454; 455/455

(58) Field of Classification Search .................. 709/223, 709/224, 225, 226, 232, 233, 234, 235; 370/230, 370/252, 468, 395.4, 395.43, 395.41, 238, 370/351, 258, 395.21, 508, 519, 395.1, 411, 370/412, 413, 477; 455/452.2, 445, 465, 455/446–455

See application file for complete search history.

(56) References Cited

U.S. PATENT DOCUMENTS

| | | | |
|---|---|---|---|
| 5,051,982 A | 9/1991 | Brown et al. | |
| 5,881,313 A | 3/1999 | Ramakrishnan et al. | |
| 6,108,306 A | 8/2000 | Kalkunte et al. | |
| 6,438,630 B1 | 8/2002 | DeMoney | |
| 6,581,113 B1 | 6/2003 | Dwork et al. | |
| 6,810,031 B1 * | 10/2004 | Hegde et al. | 370/351 |
| 6,950,394 B1 | 9/2005 | Chou et al. | |
| 6,963,946 B1 | 11/2005 | Dwork et al. | |
| 7,095,760 B1 | 8/2006 | Parruck et al. | |
| 7,124,195 B2 * | 10/2006 | Roach et al. | 709/232 |
| 7,221,676 B2 | 5/2007 | Green et al. | |
| 7,301,898 B1 | 11/2007 | Martin et al. | |
| 7,395,306 B1 | 7/2008 | Lai et al. | |
| 7,426,210 B1 | 9/2008 | Miles et al. | |
| 7,496,699 B2 | 2/2009 | Pope et al. | |
| 7,532,642 B1 * | 5/2009 | Peacock | 370/468 |
| 7,577,162 B2 * | 8/2009 | Liaw et al. | 370/468 |

(Continued)

OTHER PUBLICATIONS

"Office Action from USPTO dated Nov. 26, 2010 for U.S. Appl. No. 11/874,752".

(Continued)

Primary Examiner — John Follansbee
Assistant Examiner — Saket K Daftuar
(74) Attorney, Agent, or Firm — Klein, O'Neill & Singh, LLP

(57) ABSTRACT

Applications executed out of router memory may acquire additional bandwidth that is not being used by other applications, in order to speed up network traffic. Scavenging may occur up to a point where current congestion is detected, at which point any scavenged bandwidth is relinquished and the application returns to its prescribed limit. After current congestion is mitigated, scavenging may occur up to a limit below the point where congestion was detected. After a predetermined interval, additional scavenging may occur beyond this limit until a preset bandwidth limit is reached.

8 Claims, 7 Drawing Sheets

U.S. PATENT DOCUMENTS

| | | | |
|---|---|---|---|
| 7,596,086 B2 | 9/2009 | Wang et al. | |
| 7,610,404 B2 * | 10/2009 | Scott et al. | 709/242 |
| 7,680,038 B1 * | 3/2010 | Gourlay | 370/230 |
| 8,111,620 B1 * | 2/2012 | Swan et al. | 370/230 |
| 2002/0085492 A1 * | 7/2002 | Mukai et al. | 370/230 |
| 2002/0198927 A1 | 12/2002 | Craddock et al. | |
| 2003/0048805 A1 * | 3/2003 | Yoshihara et al. | 370/468 |
| 2003/0074554 A1 * | 4/2003 | Roach et al. | 713/153 |
| 2003/0137937 A1 | 7/2003 | Tsukishima et al. | |
| 2003/0152096 A1 * | 8/2003 | Chapman | 370/412 |
| 2003/0193942 A1 | 10/2003 | Gil | |
| 2003/0225739 A1 | 12/2003 | Chesson et al. | |
| 2004/0019696 A1 * | 1/2004 | Scott et al. | 709/242 |
| 2004/0019895 A1 | 1/2004 | Dubal | |
| 2004/0024904 A1 | 2/2004 | DiMambro | |
| 2004/0103193 A1 * | 5/2004 | Pandya et al. | 709/224 |
| 2004/0120336 A1 | 6/2004 | Hendel et al. | |
| 2004/0177164 A1 | 9/2004 | DiMambro et al. | |
| 2004/0184483 A1 * | 9/2004 | Okamura et al. | 370/477 |
| 2004/0213257 A1 * | 10/2004 | Abdelilah et al. | 370/395.1 |
| 2004/0223454 A1 | 11/2004 | Schober et al. | |
| 2004/0242219 A1 * | 12/2004 | Oie et al. | 455/422.1 |
| 2004/0249933 A1 | 12/2004 | Govindarajan et al. | |
| 2004/0260746 A1 * | 12/2004 | Brown et al. | 709/200 |
| 2005/0002389 A1 | 1/2005 | Venkatanarayan et al. | |
| 2005/0053060 A1 | 3/2005 | Pettey | |
| 2005/0060443 A1 | 3/2005 | Rosner | |
| 2005/0060445 A1 | 3/2005 | Beukema et al. | |
| 2005/0076166 A1 | 4/2005 | Shearer | |
| 2005/0128951 A1 * | 6/2005 | Chawla et al. | 370/235 |
| 2005/0131984 A1 * | 6/2005 | Hofmann et al. | 709/201 |
| 2005/0149468 A1 * | 7/2005 | Abraham | 707/1 |
| 2005/0174942 A1 | 8/2005 | Betker | |
| 2005/0198531 A1 | 9/2005 | Kaniz et al. | |
| 2005/0254519 A1 | 11/2005 | Beukema et al. | |
| 2005/0286416 A1 * | 12/2005 | Shimonishi et al. | 370/229 |
| 2006/0029097 A1 | 2/2006 | McGee et al. | |
| 2006/0106672 A1 * | 5/2006 | Mo et al. | 705/14 |
| 2006/0250959 A1 * | 11/2006 | Porat | 370/230 |
| 2007/0064732 A1 * | 3/2007 | Liaw et al. | 370/468 |
| 2007/0180119 A1 * | 8/2007 | Khivesara et al. | 709/226 |
| 2007/0237177 A1 * | 10/2007 | Endo et al. | 370/468 |
| 2007/0294410 A1 * | 12/2007 | Pandya et al. | 709/226 |
| 2008/0049787 A1 * | 2/2008 | McNaughton et al. | 370/468 |
| 2008/0052387 A1 * | 2/2008 | Heinz et al. | 709/223 |
| 2008/0112314 A1 | 5/2008 | Rider | |
| 2008/0198865 A1 * | 8/2008 | Rudnick et al. | 370/406 |
| 2008/0209246 A1 | 8/2008 | Marks et al. | |
| 2009/0069008 A1 * | 3/2009 | Highsmith et al. | 455/424 |
| 2009/0077226 A1 * | 3/2009 | Lee et al. | 709/224 |
| 2009/0116381 A1 | 5/2009 | Kanda | |
| 2009/0154358 A1 | 6/2009 | Kanda et al. | |
| 2010/0021161 A1 * | 1/2010 | Endo et al. | 398/45 |
| 2010/0085887 A1 * | 4/2010 | Ray et al. | 370/252 |
| 2010/0095021 A1 * | 4/2010 | Samuels et al. | 709/235 |
| 2010/0271962 A1 * | 10/2010 | Han et al. | 370/252 |
| 2011/0047591 A1 * | 2/2011 | Scott et al. | 726/1 |
| 2011/0149087 A1 * | 6/2011 | Jeong et al. | 348/207.1 |

OTHER PUBLICATIONS

"Notice of Allowance from USPTO dated Dec. 22, 2010 for U.S. Appl. No. 11/291,430".

"Notice of Allowance from USPTO dated Feb. 9, 2011 for U.S. Appl. No. 11/291,430".

"Office Action from USPTO dated May 13, 2011 for U.S. Appl. No. 11/874,752".

"Final Office Action from USPTO dated Oct. 24, 2011 for U.S. Appl. No. 11/874,752".

"Office Action from USPTO dated Mar. 29, 2012 for U.S. Appl. No. 11/874,752".

"Office Action from USPTO dated Mar. 18, 2009 for U.S. Appl. No. 11/291,430".

"Office Action from USPTO dated Aug. 20, 2009 for U.S. Appl. No. 11/874,752".

"Final Office Action from USPTO dated Sep. 15, 2009 for U.S. Appl. No. 11/291,430".

Pfister, Gregory F., "An Introduction to the InfiniBand Architecture", *IBM—Enterprise server Group Server Technology and Architecture*, 617-632, Jun. 2001.

"Final Office Action from USPTO dated Mar. 2, 2010 for U.S. Appl. No. 11/874,752".

* cited by examiner

SYSTEMS AND METHODS FOR BANDWIDTH SCAVENGING AMONG A PLURALITY OF APPLICATIONS IN A NETWORK

BACKGROUND

The present invention relates to networks, and in particular to allocating network bandwidth among a plurality of applications.

DESCRIPTION OF RELATED ART

Bandwidth limiting is a method of sharing network bandwidth across connections so that one connection does not consume all the available bandwidth. Typically, a network device allows a network administrator to specify a bandwidth limit for each network application. The administrator may assign all of the network bandwidth to one application or assign some percentage of the total bandwidth to each of multiple applications. Bandwidth limiting thus prevents one application from monopolizing the entire network bandwidth, thereby starving other applications.

SUMMARY

The various embodiments of the present systems and methods for bandwidth scavenging among a plurality of applications in a network have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present systems and methods for bandwidth scavenging includes the realization that under certain circumstances bandwidth limiting is inefficient. For example, in the case where a first application has a large burst of traffic and other applications have little or no traffic, the first application is limited to its assigned bandwidth even though the other applications are consuming little or no bandwidth. Thus, even though a portion of the bandwidth is unused, it is unavailable to the first application, which could otherwise use it to speed up its large burst of traffic. Accordingly, improved systems and methods for bandwidth allocation among competing applications would speed up network traffic.

One embodiment of the present systems and methods comprises a machine-implemented method for bandwidth scavenging among a plurality of applications in a network. The method comprises a first one of the applications stored in memory of a first network device sending packets to the network within a prescribed bandwidth limit of the first application. The method further comprises the first device allocating, incrementally, additional bandwidth to the first application beyond the first application's prescribed bandwidth limit. The method further comprises the first application using the additional bandwidth to send additional packets to the network. The method further comprises while using the additional bandwidth, if the first device does not detect congestion in the network, the first device continuing to allocate, incrementally, additional bandwidth until either a preset limit of the first application is reached or the first device detects congestion in the network.

Another embodiment of the present systems and methods comprises a router configured for routing and forwarding information in a network. The router comprises a plurality of ports. Each port is configured to manage a point-to-point connection between itself and another device in the network. The router further comprises a processor for executing computer-executable process steps. The router further comprises a memory for storing a plurality of applications for sending packets to the network according to an amount of bandwidth allocated to each application. The memory further stores a plurality of parameters for allocating additional bandwidth to each application. The router further comprises a bandwidth scavenging module for allocating, incrementally, the additional bandwidth to a first one of the applications when the first application has a large burst of traffic to send to the network.

Another embodiment of the present systems and methods comprises a network of devices configured for sending and receiving information. The network comprises a host computing system including a memory for storing computer-executable process steps and a processor for executing the computer-executable process steps. The network further comprises a router configured for routing and forwarding information in the network, including information sent to and from the host system. The router comprises a plurality of ports. Each port is configured to manage a point-to-point connection between itself and another device in the network. The router further comprises a processor for executing computer-executable process steps. The router further comprises a memory for storing a plurality of applications for sending packets to the network according to an amount of bandwidth allocated to each application. The memory further stores a plurality of parameters for allocating additional bandwidth to each application. The router further comprises a bandwidth scavenging module for allocating, incrementally, the additional bandwidth to a first one of the applications when the first application has a large burst of traffic to send to the network.

BRIEF DESCRIPTION OF THE DRAWINGS

The various embodiments of the present systems and methods for bandwidth scavenging among a plurality of applications in a network now will be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts.

DETAILED DESCRIPTION

Figure 1:
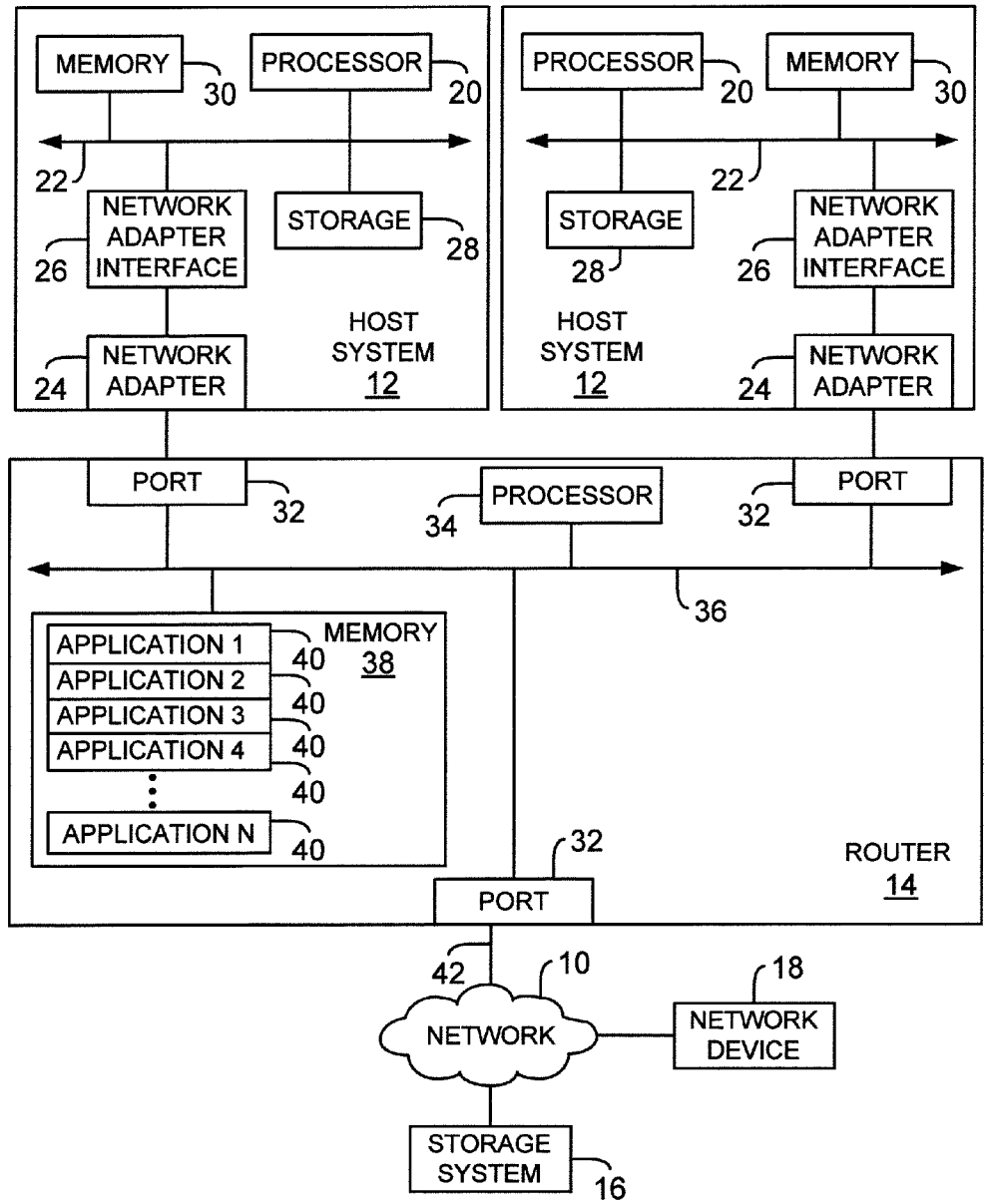
FIG. 1 is a functional block diagram of a typical network, including host systems connected to the network through a router.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications, including Fibre Channel, InfiniBand, Serial Attached SCSI (SAS) and others. Below is a brief introduction to some of these standards.

Fibre Channel is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches host systems directly to a Fabric, which are then connected to multiple devices. The Fibre Channel Fabric topology allows several media types to be interconnected.

InfiniBand is a switched fabric interconnect standard for servers. The technology is deployed for server clusters/enterprise data centers ranging from two to thousands of nodes. The InfiniBand standard is published by the InfiniBand Trade Association, and is incorporated herein by reference in its entirety.

Serial Attached SCSI (SAS) is a computer bus technology primarily designed for transfer of data to and from devices like hard-disks, CD-ROM and so on. SAS is a serial communication protocol for direct attached storage devices. It is designed as a replacement for parallel SCSI, allowing for higher speed data transfers, and is backwards compatible with the serial ATA (SATA) standard. Though SAS uses serial communication instead of the parallel communication found in traditional SCSI devices, it still uses SCSI commands for interacting with SAS end devices. The SAS protocol is developed and maintained by T10 committee and is incorporated herein by reference in its entirety.

FIG. 1 is a functional block diagram of a typical network, including host systems connected to the network through a router. The network includes a plurality of devices. For example, the network may include a storage system and other network devices. These other devices may include, for example, servers, peripheral devices, input/output subsystems, bridges, hubs, switches, routers etc.

FIG. 1 is a functional block diagram of a typical network 10, including host systems 12 connected to the network 10 through a router 14. The network 10 includes a plurality of devices. For example, the network 10 may include a storage system 16 and other network devices 18. These other devices 18 may include, for example, servers, peripheral devices, input/output subsystems, bridges, hubs, switches, routers etc.

FIG. 1 illustrates the internal functional architecture of a typical host system 12 and a typical router 14. The host system 12 includes a processor 20, also known as a central processing unit (CPU). The processor 20 executes computer-executable process steps and interfaces with a computer bus 22. The computer bus 22 may be, for example, a system bus, a Peripheral Component Interconnect (PCI) bus (or PCI Express bus), a HyperTransport or industry standard architecture (ISA) bus, a SCSI bus, a universal serial bus (USB), or an Institute of Electrical and Electronics Engineers (IEEE) standard 1394 bus (sometimes referred to as "Firewire").

The host system 12 further includes a network adapter 24 that facilitates communication between the host system 12 and the network 10. A network adapter interface 26 facilitates the ability of the host system 12 to interface with the network adapter 24. The host system 12 may include other devices and interfaces (not shown), which may include a display device interface, a keyboard interface, and/or a pointing device interface.

The host system 12 further includes a storage device 28, which may be for example a hard disk, non-volatile memory, such as flash memory, a CD-ROM or any other device. Storage 28 stores operating system program files, application program files, and other files. Some of these files are stored on storage 28 using an installation program. For example, the processor 20 may execute computer-executable process steps of an installation program so that the processor 20 can properly execute the application program.

Memory 30 also interfaces with the computer bus 22 to provide the processor 20 with access to memory storage. Memory 30 may include random access main memory (RAM) and read only memory (ROM). When executing stored computer-executable process steps from memory 30, the processor 20 stores and executes the process steps out of RAM. ROM stores invariant instruction sequences, such as start-up instruction sequences or basic input/output operating system (BIOS) sequences for operation of a keyboard (not shown).

With continued reference to FIG. 1, the host system 12 communicates with the network 10 through the router 14. Generally, a router 14 is a networking device whose software and hardware are tailored to the tasks of routing and forwarding information. The router 14 includes a plurality of ports 32. Each port 32 manages a point-to-point connection between itself and its attached system. Each port 32 can be attached to, for example, a server, a peripheral device, an input/output subsystem, a bridge, a hub, a switch, or even another router. In the illustrated embodiment, the router 14 includes two ports 32 connected to host systems 12, and one port 32 connected to a device (not shown) in the network 10. Those of ordinary skill in the art will appreciate that the router 14 may have any number of ports 32, and the illustrated example is not limiting.

Figure 5:
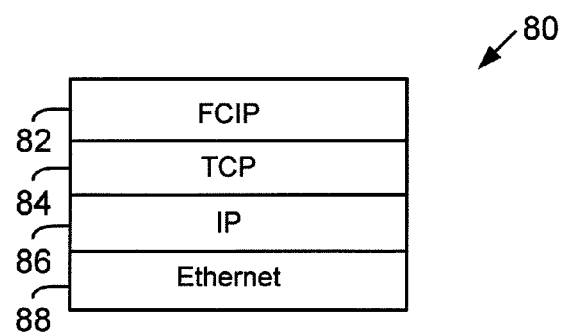
FIG. 5 is a functional block diagram of a layered protocol structure.

With continued reference to FIG. 1, the router 14 further includes a processor 34 that executes computer-executable process steps and interfaces with a bus 36. Memory 38 also interfaces with the bus 36 to provide the processor 34 with access to memory storage. The processor 34 executes a plurality of applications 40 that are stored in the memory 38. One example application is Fibre Channel over Internet Protocol (FCIP). Routers use FCIP to exchange FC frames with a remote peer, as discussed further below with respect to FIG. 5. Another example application is Internet Small Computer System Interface (iSCSI). These applications are also referred to as network applications or network protocols.

Some of these applications 40 send information to the network 10 in the form of packets. Thus, each of these applications 40 requires at least some bandwidth through which to send its packets. Generally, bandwidth is a measure of available data communication resources. To send data to the network 10, each application 40 sends data over the link 42 that connects the router 14 to the network 10. This link 42 has a maximum amount of data that it can send in a given time. This amount is expressed in bits per second (bits/s), or some multiple thereof (kbits/s, Mbits/s, etc.), and is commonly referred to as bandwidth. In some instances, portions of the overall available bandwidth on the link 42 are allocated to each application 40 so that one application 40 does not consume all of the available bandwidth and starve the other applications 40. But in the case where a first application 40 has a large burst of traffic and other applications 40 have little or no traffic, the first application 40 is limited to its assigned bandwidth even though the other applications 40 are consuming little or no bandwidth. Thus, even though a portion of the bandwidth is unused, it is unavailable to the first application 40, which could otherwise use it to speed up its large burst of traffic. The present embodiments provide improved systems and methods for bandwidth allocation among competing applications 40 to speed up network traffic.

Figure 2:
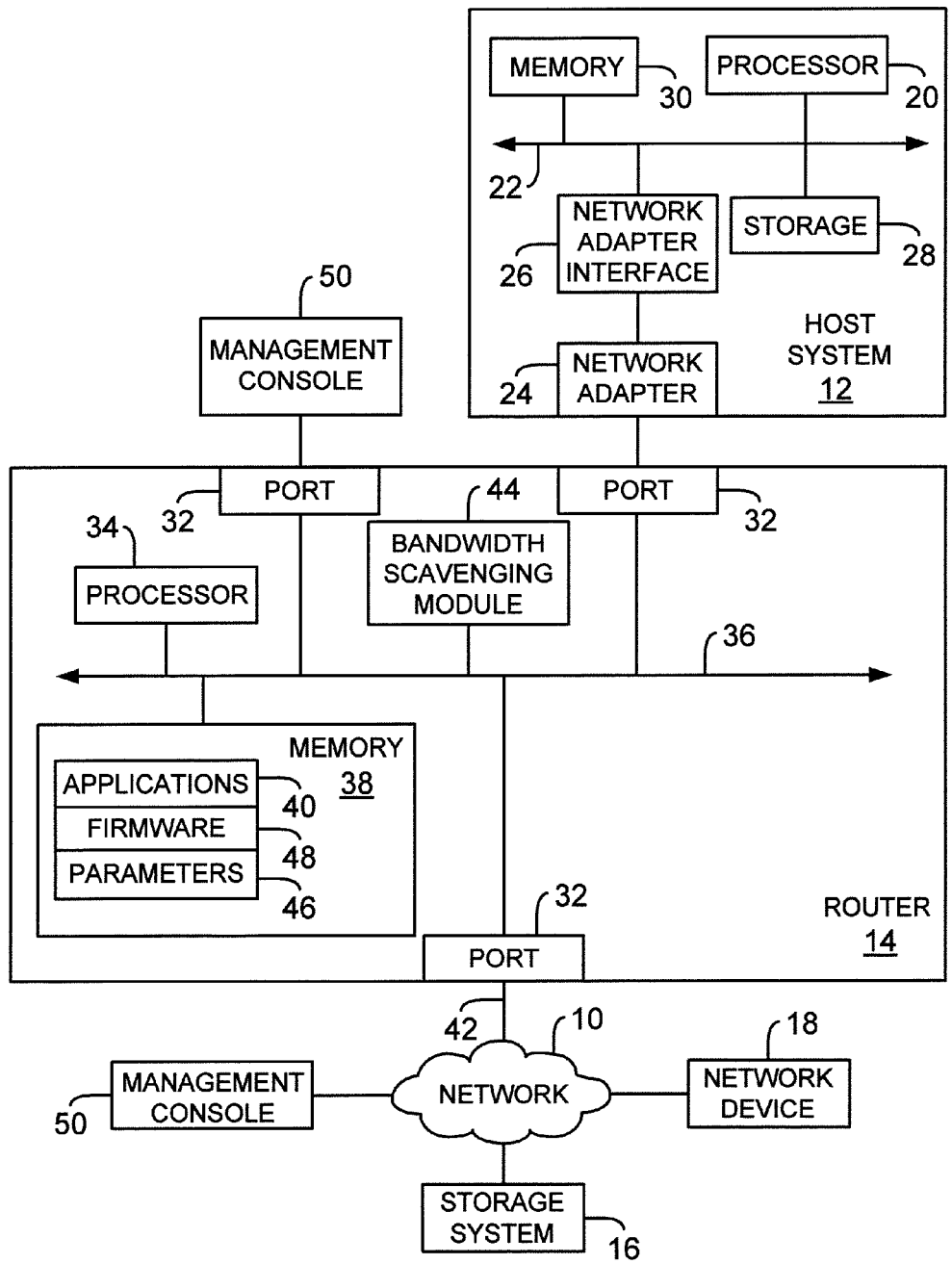
FIG. 2 is a functional block diagram of one embodiment of the present systems for bandwidth scavenging among a plurality of applications in a network.

FIG. 2 illustrates one embodiment of the present systems for bandwidth scavenging among a plurality of applications in a network. The router includes a bandwidth scavenging module that interfaces with the computer bus. The bandwidth scavenging module executes instructions described below that enables each of the applications to acquire additional bandwidth as needed. The instructions involve a plurality of parameters, also described below, that may be stored in the router's memory. In the illustrated embodiment, the method for bandwidth scavenging is executed in a combination of software and firmware, both of which are stored in the router's memory. In other embodiments, the method may be executed by any combination of hardware, firmware and software, or by any of these alone.

FIG. 2 illustrates one embodiment of the present systems for bandwidth scavenging among a plurality of applications 40 in a network 10. The router 14 includes a bandwidth scavenging module 44 that interfaces with the computer bus 36. The bandwidth scavenging module 44 executes instructions described below that enable each of the applications 40 to acquire additional bandwidth as needed. The instructions involve a plurality of parameters 46, also described below, that are stored in the router's memory 38. In the illustrated embodiment, the method for bandwidth scavenging may be executed by firmware 48, which is stored in the router's memory 38. In other embodiments, the method may be executed by any combination of hardware, firmware and software, or by any of these alone. FIG. 2 further illustrates a management console 50 connected to the router 14 via one of the ports 32. The management console 50 may have functional architecture similar to that of the illustrated host system 12. The management console 50 may be used to configure certain aspects of the present embodiments, such as initial values of the parameters 46. As shown, a management console 50 may also be connected to the network 10 through another network device (not shown) in the network.

Generally, in the present methods for bandwidth scavenging, a first application 40 begins with a Prescribed Bandwidth Limit 52, which is something less than the full available bandwidth. The first application 40 is allowed to exceed its Prescribed Bandwidth Limit 52 if other applications 40 are not using a significant portion of their prescribed bandwidth. In this case, the first application 40 is allocated, incrementally, additional bandwidth. As the first application 40 consumes more and more bandwidth, if no congestion is detected in the network 10, then it continues to use the scavenged bandwidth until its workload abates. The longer an application's workload persists, the more bandwidth it may scavenge until it has consumed a Preset Bandwidth Limit 54. In one example, the Preset Bandwidth Limit 54 may be twice the Prescribed Bandwidth Limit 52.

On the other hand, if network 10 congestion is detected after the Prescribed Bandwidth Limit 52 has been exceeded, the extra bandwidth is deducted from the first application 40 so as not to negatively impact other applications 40. After relinquishing the extra bandwidth, the first application 40 may again scavenge bandwidth as previously described. However, during a Preset Interval, also referred to as a Limit Adjust Timeout 56, the first application 40 will not grow the scavenged bandwidth beyond the limit where congestion was detected in the previous scavenge. After the Preset Interval 56, the first application 40 may again scavenge bandwidth as previously described.

Figure 3:
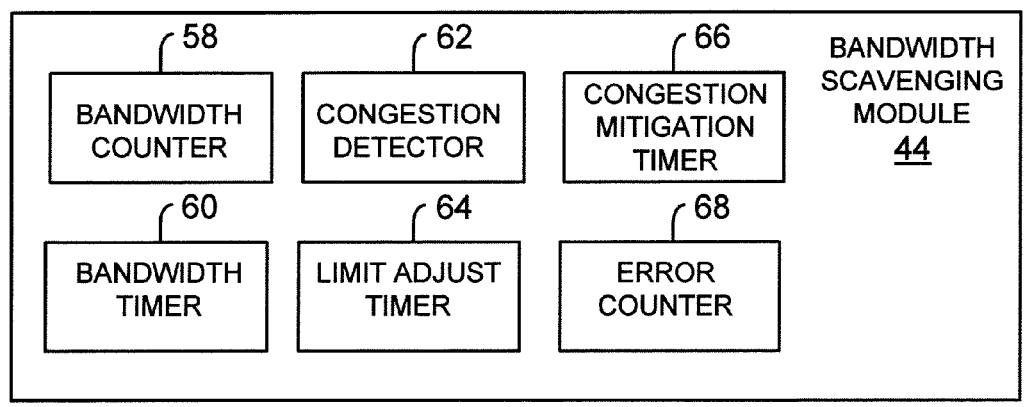
FIG. 3 is a functional block diagram of a bandwidth scavenging module configured for use in one embodiment of the present systems and methods for bandwidth scavenging among a plurality of applications in a network.

FIG. 3 is a functional block diagram of the Bandwidth Scavenging Module 44. The module includes a plurality of components. For example, the illustrated embodiment may include a Bandwidth Counter 58, a Bandwidth Timer 60, a Congestion Detector 62, a Limit Adjust Timer 64, a Congestion Mitigation Timer 66, and an Error Counter 68. The functionality of each of these components is described below. Each of these components can be implemented in any combination of hardware, firmware and software, or in any of these alone. In certain embodiments, separate components may be provided for each of the applications 40 stored in the router memory 38. Thus, if four applications 40 are stored in the router memory 38 at a given time, four Bandwidth Counters 58, four Bandwidth Timers 60, etc. may be provided in the Bandwidth Scavenging Module 44, with each Counter, Timer, etc. corresponding to a different one of the applications 40.

Figure 4:
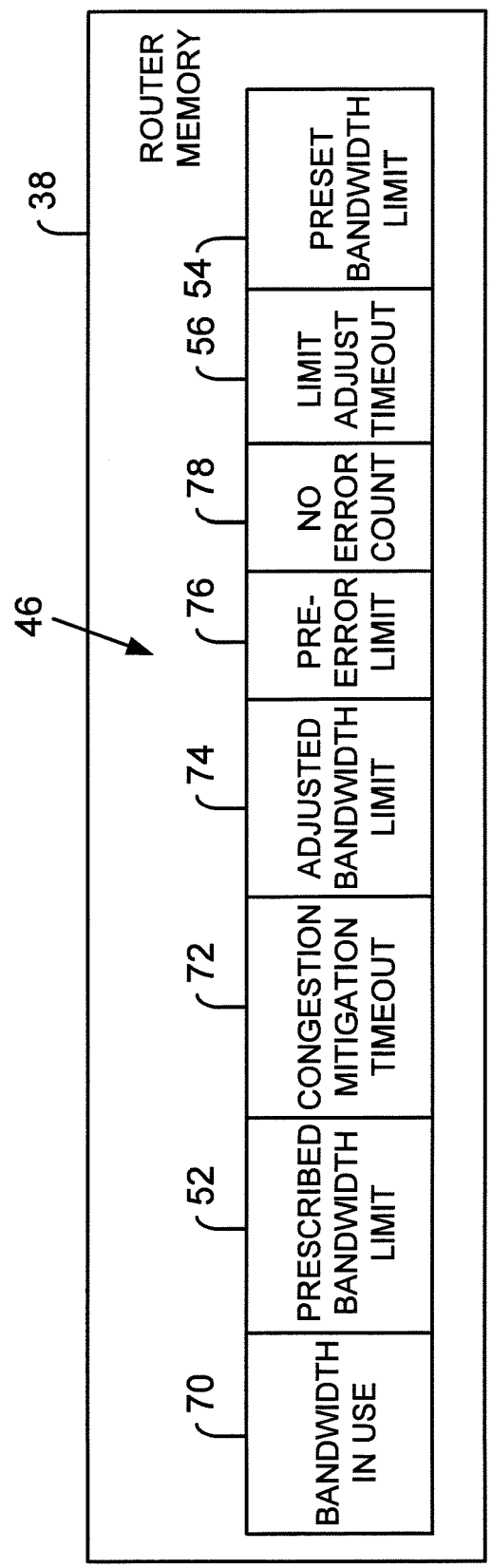
FIG. 4 is a functional block diagram of a router memory storing bandwidth scavenging parameters as in one embodiment of the present systems and methods for bandwidth scavenging among a plurality of applications in a network.

FIG. 4 is a functional block diagram of the router memory 38, which stores the bandwidth scavenging parameters 46. For example, the illustrated embodiment includes the following parameters: Bandwidth In Use 70, Prescribed Bandwidth Limit 52, Congestion Mitigation Timeout 72, Adjusted Bandwidth Limit 74, Pre-Error Limit 76, No Error Count 78, Limit Adjust Timeout 56, and Preset Bandwidth Limit 54. The functionality of each of these parameters 46 is described below. A value of each of these parameters 46 is stored in the router memory 38 and accessed by the Bandwidth Scavenging Module 44. In certain embodiments, separate values for each of the foregoing parameters 46 may be provided for each of the applications 40 stored in the router memory 38. Thus, if four applications 40 are stored in the router memory 38 at a given time, four values of Bandwidth In Use 70, four values of Prescribed Bandwidth Limit 52, etc. may be maintained in the router memory 38, with each value corresponding to a different one of the applications 40.

In certain embodiments, the present methods for bandwidth scavenging are associated with sending network application protocol data units (PDUs). Further, certain embodiments of the present methods operate at the router 14 level, prior to data being sent out to the network 10. These embodiments are described with further reference to FIG. 5, which is a functional block diagram of a layered protocol structure 80 for Fibre Channel Over TCP/IP (FCIP). FCIP describes mechanisms that allow the interconnection of Fibre Channel (FC) devices over IP-based networks. FCIP relies on IP-based network services to provide the connectivity between the FC devices over local area networks, metropolitan area networks, or wide area networks. The primary function of an FCIP Entity is forwarding FC Frames, employing FC Frame Encapsulation. Viewed from the IP Network perspective, FCIP Entities are peers and communicate using TCP/IP. Each FCIP Entity contains one or more TCP endpoints in the IP-based network. Viewed from the FC Fabric perspective, pairs of FCIP Entities, in combination with their associated FC Entities, forward FC Frames between FC Fabric elements. The FC End Nodes are unaware of the existence of the FCIP Link.

In one embodiment, the router 14 encapsulates each FC frame prior to sending it to the network 10. This encapsulation enables FC frames to be sent over IP-based networks, as described below. The layered structure shown in FIG. 5 includes the application layer (FCIP) 82, the transport layer (Transmission Control Protocol, TCP) 84, the network layer (Internet Protocol, IP) 86, and the data link layer (Ethernet) 88.

In one example, an initiator device and a target device are FC devices and the network 10 is Ethernet. In this case, within the router 14 FCIP encapsulates Fibre Channel Information Units (FCIUs) with an FCIP header and submits them to the TCP/IP stack for sending via Ethernet. Prior to sending FCIP PDUs to the remote FCIP peer, the FCIP applications 40 establish one or more TCP connections for use in exchanging FCIP PDUs with the remote peer. Prior to establishing a TCP connection, in certain embodiments of the present methods the FCIP application 40 initializes the bandwidth scavenging function. After receiving an FCIU and encapsulating it into an FCIP PDU, the FCIP application 40 passes the FCIP PDU to a send function. The send function sends PDUs and scavenges bandwidth as necessary according to the description provided below.

The following discussion provides a brief introduction into the functionality of the bandwidth scavenging parameters 46. Each of these parameters 46 is discussed in further detail below with respect to the process flow of FIG. 6.

Bandwidth In Use 70

A count of how many bytes of application 40 data has been transmitted since a last Bandwidth Timer event. A Bandwidth Timer event occurs each time the Bandwidth Timer 60 counts through a preset interval, discussed further below. This parameter is initialized to zero prior to establishing a connection with a network device 18. As data is transmitted, this parameter is incremented by the amount of data transmitted. This parameter is reset to zero when the Bandwidth Timer 60 expires.

Prescribed Bandwidth Limit 52

A value specified to assign a portion of the network 10 bandwidth to a network application 40. In one embodiment all of the bandwidth may be assigned to one application 40, but typically the total bandwidth is split among a plurality of applications 40. The value of the Prescribed Bandwidth Limit 52 may be defined by an administrator using, for example, the management console 50. Alternatively, the administrator may use a Graphical User Interface (GUI) of the router 14 or a Command Line Interface (CLI) to specify the value for this parameter when configuring the router 14. Each application 40 in the router memory 38 has its own Prescribed Bandwidth Limit 52. The values are saved and the router memory 38 recalled by the router 14 when network applications 40 are started.

Congestion Mitigation Timeout 72

A time period during which the network application 40 bandwidth for all applications 40 is based on the Prescribed Bandwidth Limit 52 and Bandwidth Scavenging is disabled. During this time period, the Bandwidth Timer 60 routine decrements (decreases) the Congestion Mitigation Timeout 72 value from an initial value until it reaches zero.

Adjusted Bandwidth Limit 74

Initialized to the Prescribed Bandwidth Limit 52 prior to establishing a connection with a network device 18. It is also reset to the Prescribed Bandwidth Limit 52 when congestion is detected, when the Bandwidth Timer 60 expires, or when a given network application 40 is consuming less than the Prescribed Bandwidth Limit 52. Adjusted Bandwidth Limit 74 grows as an application 40 consumes bandwidth beyond its Prescribed Bandwidth Limit 52 and congestion does not occur.

Pre-Error Limit 76

Initialized to the Prescribed Bandwidth Limit 52 prior to establishing a connection to a network device 18. Set to the Adjusted Bandwidth Limit 74 minus the Maximum Network application 40 packet size whenever congestion is detected. After congestion has been mitigated, Adjusted Bandwidth Limit 74 is not grown beyond the value of the Pre-Error Limit 76 until the Limit Adjust Timeout 56 expires. The Pre-Error Limit 76 thus provides a smoothing mechanism for bandwidth scavenging.

No Error Count 78

Indicates the number of packets sent after the Prescribed Bandwidth Limit 52 has been exceeded. In certain embodiments, No Error Count 78 is initialized to zero and reset to zero whenever: congestion occurs when No Error Count 78 is nonzero, a Bandwidth Timer event occurs, or the Adjusted Bandwidth Limit 74 is grown. An Error Counter 68 in the Bandwidth Scavenging Module 44 counts the number of packets sent after the Prescribed Bandwidth Limit 52 has been exceeded, and stores this value in router memory 38.

Limit Adjust Timeout 56

A time interval during which the Adjusted Bandwidth Limit 74 is prevented from growing beyond the Pre-Error Limit 76 value. This parameter is initialized to zero prior to establishing a connection with a network device 18. When congestion is detected the Limit Adjust Timeout 56 value is set to a predetermined value and then decremented when the Bandwidth Timer 60 expires. Until the Limit Adjust Timeout 56 expires, the Adjusted Bandwidth Limit 74 cannot grow beyond the Pre-Error Limit 76. Once the Limit Adjust Timeout 56 expires, the Adjusted Bandwidth Limit 74 is allowed to grow beyond the Pre-Error Limit 76 value.

Preset Bandwidth Limit 54

Initialized to any desired value. This parameter provides a maximum bandwidth limit beyond which no application 40 may grow under any circumstances. In one embodiment, this parameter may be initialized to twice the Prescribed Bandwidth Limit 52.

Figure 6A:
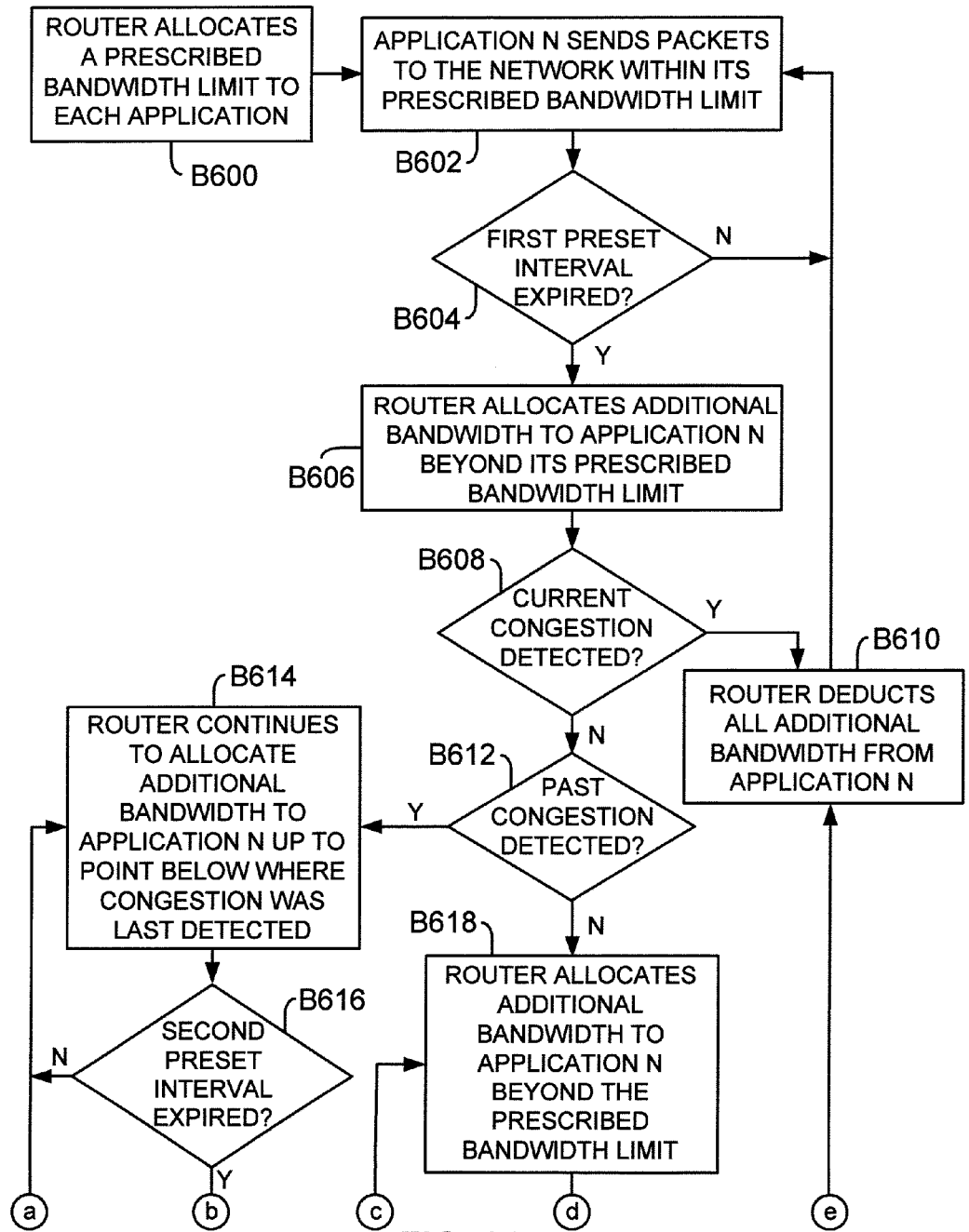
FIGS. 6A and 6B are a flowchart illustrating one embodiment of the present methods for bandwidth scavenging among a plurality of applications in a network.
Figure 6B:
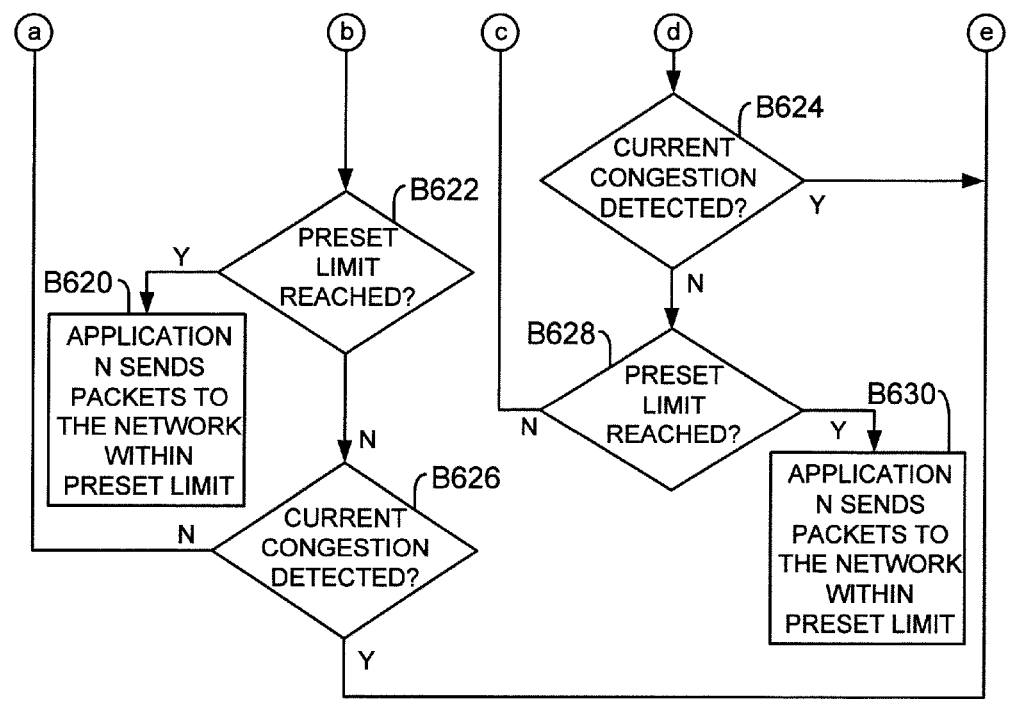

FIG. 6 illustrates one embodiment of the present methods for bandwidth scavenging among a plurality of applications 40 in a network 10. Several of the steps below are described with respect to a single application 40. However, those of ordinary skill in the art will appreciate that in many instances multiple applications 40 will be executed out of router memory 38 concurrently. Thus, many of the steps below will occur for multiple applications 40. However, for clarity, portions of the description below focus on a single application 40.

The method begins at block B600, when the router 14 allocates a portion of the available bandwidth to each application 40. The portion allocated to each application 40 is referred to as that application's Prescribed Bandwidth Limit 52. The Prescribed Bandwidth Limit 52 is a measure of the amount of data that a given application 40 can send to the network 10 in a given time. The values of each application's Prescribed Bandwidth Limit 52 are stored in the router memory 38 (FIG. 4). The Prescribed Bandwidth Limit 52 is a configurable value that may be set by a user using a management console 50.

At block B602, a first one of the applications 40 (Application N) sends packets to the network 10 within its Prescribed Bandwidth Limit 52. The Bandwidth Counter 58 and the Bandwidth Timer 60 in the Bandwidth Scavenging Module 44 facilitate limiting each application 40 to its Prescribed Bandwidth Limit 52. The Bandwidth Timer 60 measures the elapsed time since the last Bandwidth Timer event. For example, the Bandwidth Timer 60 may measure successive intervals of 20 ms. A Bandwidth Timer event would thus occur every 20 ms. During each 20 ms interval, each application 40 may only send a certain quantity of data (the Prescribed Bandwidth Limit 52), and the Bandwidth Counter 58 maintains a count of the amount of data sent by each application 40 during this interval. The value of this count is referred to as Bandwidth In Use 70, and is stored in the router memory 38 (FIG. 4). If the value of the Bandwidth Counter 58 for a given application 40 reaches the Prescribed Bandwidth Limit 52 for that application 40 before the next Bandwidth Timer event occurs, that application 40 stops sending data until the next Bandwidth Timer event occurs, unless the Adjusted Bandwidth Limit 74 for that application 40 is greater than its Prescribed Bandwidth Limit 52, as described further below. Those of ordinary skill in the art will appreciate that the example of 20 ms between Bandwidth Timer events is not limiting and other time intervals may be used.

At block B604, the Bandwidth Scavenging Module 44 determines whether a first preset interval has expired. The Congestion Mitigation Timer 66 in the Bandwidth Scavenging Module 44 may be used for block B604. The Congestion Mitigation Timer 66 measures the elapsed time since congestion was last detected in the network 10. A value stored in the router memory 38, Congestion Mitigation Timeout 72, provides an interval during which bandwidth scavenging is disabled after congestion is detected in the network 10. When congestion is detected, as described below, each application 40 relinquishes any bandwidth scavenged up to that point, and the Congestion Mitigation Timer 66 begins to countdown from the Congestion Mitigation Timeout 72 value. In one non-limiting example, the Congestion Mitigation Timeout 72 value may be 2 seconds. Until the value of the Timer 66 reaches zero, no applications 40 may scavenge bandwidth. All applications 40 use their respective Prescribed Bandwidth Limits 52 to transmit information. This period is also referred to herein as the first preset interval. At block B604, if the first preset interval has not expired, the process returns to block B602 and each application 40 may continue to send data to the network 10 within its Prescribed Bandwidth Limit 52.

If at block B604 it is determined that the first preset interval has expired, the method advances to block B606. There, the router 14 allocates additional bandwidth to Application N beyond its Prescribed Bandwidth Limit 52. Application N continues to call the send function to cause more data to be sent to the network. A new bandwidth limit is thus defined for each application 40. Referred to as the Adjusted Bandwidth Limit 74, the new limit is the sum of the Prescribed Bandwidth Limit 52 and any additional bandwidth allocated to the application 40 by the router 14. The value of the Adjusted Bandwidth Limit 74 for each application 40 is stored in the router memory 38. In one embodiment, the Adjusted Bandwidth Limit 74 may be capped at one and a half times the value of the Prescribed Bandwidth Limit. Those of ordinary skill in the art will appreciate that the foregoing example of the amount of additional bandwidth allocated is not limiting.

At block B608, the router 14 determines whether current congestion was detected when Application N exceeded its Prescribed Bandwidth Limit 52. A Congestion Detector 62 of the Bandwidth Scavenging Module 44 (FIG. 4) may perform this step. The manner in which the Congestion Detector 62 detects congestion may vary based upon network protocol. In one example, statistics such as TCP retransmission count and Ethernet Pause Frame Count may be used to detect network congestion.

If at block B608 current congestion is detected, the method advances to block B610. There, the router 14 deducts from Application N all bandwidth that had been allocated beyond the Prescribed Bandwidth Limit 52, and reinitializes at least some of the bandwidth parameters 46 stored in the router memory 38. For example, the Adjusted Bandwidth Limit 74 is reset to the Prescribed Bandwidth Limit 52. The Congestion Mitigation Timer 66 is reset to the Congestion Mitigation Timeout 72 value, and thereafter counts down to zero. Limit Adjust Timer 64 is set to the Limit Adjust Timeout 56 value, and thereafter counts down to zero. Until the value of the Congestion Mitigation Timer 66 reaches zero, Application N may not scavenge any bandwidth. Application N is clamped to its Prescribed Bandwidth Limit 52 during this interval. Until the value of the Limit Adjust Timer 64 reaches zero, Application N may only scavenge bandwidth up to the Pre-Error Limit 76, as described further below.

If current congestion is detected at block B608, at block B610 the Pre-Error Limit 76 value (FIG. 4) is set to the value of the Adjusted Bandwidth Limit 74 minus a maximum packet size that can be sent over the network 10. The Pre-Error Limit 76 thus sets a limit on the amount of additional bandwidth that Application N may scavenge after the congestion detected at block B608 has been mitigated, i.e. after the Congestion Mitigation Timer 66 reaches zero. After congestion mitigation, but before the Limit Adjust Timeout 56 (discussed below) expires, the Adjusted Bandwidth Limit 74 for Application N will not be grown past the Pre-Error Limit 76. The Pre-Error Limit 76 thus provides a smoothing mechanism for the present bandwidth scavenging methods.

Further, if current congestion is detected at block B608, at block B610 No Error Count 78 is reset to zero and Limit Adjust Timeout 56 is reset to its maximum value. After block B610, the illustrated method proceeds back to block B602.

If current congestion is not detected at block B608, then at block B612 the router 14 determines whether past congestion was detected. Past congestion is indicated when the value of the Limit Adjust Timer 64 (FIG. 3) is nonzero. The Limit Adjust Timer 64, like the Congestion Mitigation Timer 66, is set to a predetermined value when congestion is detected. And in certain embodiments the Limit Adjust Timer 64 is set to a value greater than the Congestion Mitigation Timer 66. Both timers are then decremented. Thus, the Congestion Mitigation Timer 66 will reach zero first, after which additional bandwidth may be allocated to applications 40 above the Prescribed Bandwidth Limit 52. However, until the Limit Adjust Timer 64 reaches zero, application 40 bandwidth may not grow above the Pre-Error Limit 76. When the Limit Adjust Timer 64 reaches zero, bandwidth may then grow above the Pre-Error Limit 76. Because the Limit Adjust Timer 64 is set to a greater value than the Congestion Mitigation Timer 66 when congestion is detected, a nonzero value of the Congestion Mitigation Timer 66 indicates current congestion, and a nonzero value of the Limit Adjust Timer 64 indicates past congestion.

If past congestion was detected at block B612, the method proceeds to block B614. There, the router 14 allocates additional bandwidth to Application N, but not beyond the Pre-Error Limit 76. Additional bandwidth may not be allocated to Application N until the Limit Adjust Timer 64 reaches zero. Thus, at block B616 the Bandwidth Scavenging Module 44 determines whether the Limit Adjust Timer 64 has expired. If it has not, then the process loops back to block B614, where the router 14 may allocate additional bandwidth up to the Pre-Error Limit 76. When the Limit Adjust Timer 64 expires, the process advances to block B622.

At block B622, the Bandwidth Scavenging Module 44 determines whether Application N has reached its Preset Bandwidth Limit 54. As described above, the Preset Bandwidth Limit 54 is a maximum bandwidth limit for each application 40, and may never be exceeded. In one embodiment, this parameter may be set to twice the Prescribed Bandwidth Limit 52. If the Preset Bandwidth Limit 54 has been reached, then the process proceeds to block B620, where Application N may continue to send packets to the network 10 within the Preset Bandwidth Limit 54 until the next Bandwidth Timer event.

If, however, the Preset Bandwidth Limit 54 has not been reached, then the process proceeds to block B626, where the Bandwidth Scavenging Module 44 determines whether current congestion was detected after the additional bandwidth was allocated to Application N. If no current congestion was detected, then the process loops back to block B614, where yet additional bandwidth may be allocated to Application N. However, if current congestion was detected, then the process loops back to block B610, which is described above.

If at block B612 no past congestion was detected, then the process moves to block B618. At block B618, the router 14 allocates additional bandwidth to Application N beyond its Prescribed Bandwidth Limit 52. This block is similar to block B606, which is described above. The process then moves to block B624.

At block B624, the Bandwidth Scavenging Module 44 determines whether current congestion was detected after additional bandwidth was allocated to Application N at block B618. This block is similar to block B608, which is described above. If current congestion was detected at block B624, the process loops back to block B610, which is described above. However, if no current congestion was detected at block B624, the process advances to block B628.

At block B628, the Bandwidth Scavenging Module 44 determines whether Application N has reached its Preset Bandwidth Limit 54. This block is similar to block B622, which is described above. If the Preset Bandwidth Limit 54 has been reached, then the process proceeds to block B630, where Application N may continue to send packets to the network 10 within the Preset Bandwidth Limit 54 until the next Bandwidth Timer event. If, however, the Preset Bandwidth Limit 54 has not been reached, then the process loops back to block B618, where yet additional bandwidth may be allocated to Application N.

Figure 7:
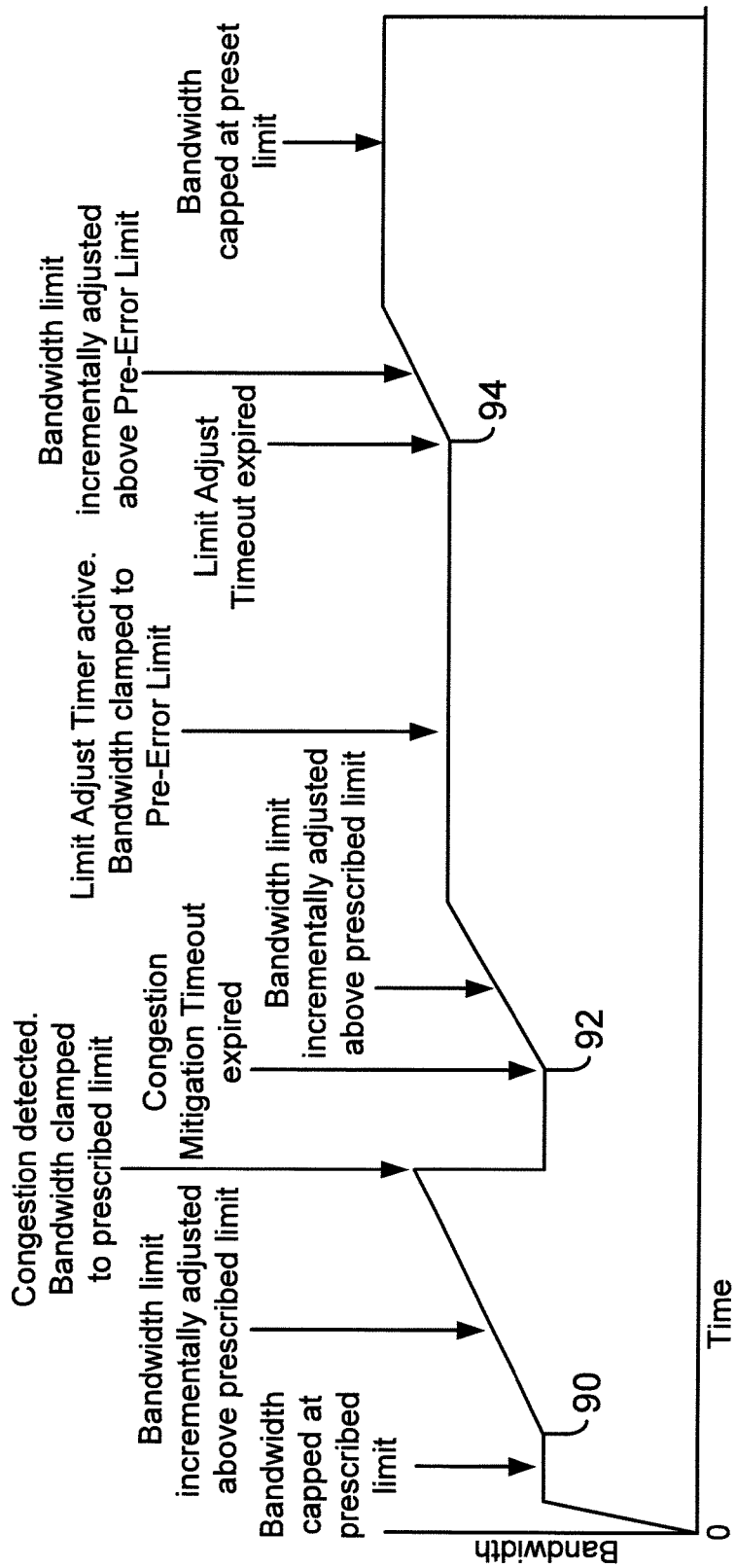
FIG. 7 is a timeline illustrating one embodiment of the present methods for bandwidth scavenging among a plurality of applications in a network.

FIG. 7 is a timeline that further illustrates the present methods for bandwidth scavenging. The process begins at time zero, where Application N sends data to the network 10 up to its Prescribed Bandwidth Limit 52. At the next Bandwidth Timer event 90, Application N may scavenge additional bandwidth above its Prescribed Bandwidth Limit 52. Scavenging may continue until the Preset Bandwidth Limit 54 is reached, or until current congestion is detected. If current congestion is detected, the scavenged bandwidth is relinquished, and Application N returns to its Prescribed Bandwidth Limit 52. Application N may then continue sending data to the network 10 within its Prescribed Bandwidth Limit 52 until the Congestion Mitigation Timeout 72 expires at 92. After the Congestion Mitigation Timeout 72 expires at 92, Application N may again scavenge bandwidth, but only up to the Pre-Error Limit 76. At this stage, Application N may send data to the network 10 within the Pre-Error Limit 76, but waits until the Limit Adjust Timeout 56 expires at 94 before scavenging any additional bandwidth. After the Limit Adjust Timeout 56 expires at 94, Application N may scavenge additional bandwidth up to the Preset Limit. At any point along the above timeline, if current congestion is detected, any scavenged bandwidth is relinquished, and Application N returns to its Prescribed Bandwidth Limit 52.

The above description includes several timers and counters. In the examples given, each of the timers/counters is described as being initialized to an initial value and then incremented or decremented to a final value. In most if not all of these cases, the magnitudes of the initial and final values of the timers/counters are of no moment. Any example values provided above for initial and/or final values should not be interpreted as limiting. Rather, the timers/counters are provided to measure intervals of predetermined length after which a given condition of the present systems and methods may change. The intervals measured by the timers/counters can have any desired length, and no example length provided above should be interpreted as limiting.

The above description presents the best mode contemplated for carrying out the present systems and methods for bandwidth scavenging among a plurality of applications in a network, and of the manner and process of practicing them, in such full, clear, concise, and exact terms as to enable any person skilled in the art to which they pertain to practice this system and these methods. These systems and methods are, however, susceptible to modifications and alternate constructions from those discussed above that are fully equivalent. Consequently, these systems and methods are not limited to the particular embodiments disclosed. On the contrary, these systems and methods cover all modifications and alternate constructions coming within the spirit and scope of the systems and methods as generally expressed by the following claims, which particularly point out and distinctly claim the subject matter of the systems and methods.

What is claimed is:

1. A machine-implemented method for bandwidth scavenging among a plurality of applications in a network, the method comprising:
    a first one of the applications stored in memory of a first network device sending packets to the network within a prescribed bandwidth limit of the first application;
    the first device allocating, incrementally, additional bandwidth to the first application beyond the first application's prescribed bandwidth limit;
    the first application using the additional bandwidth to send additional packets to the network; and
    while using the additional bandwidth, if the first device does not detect congestion in the network, the first device continuing to allocate, incrementally, additional bandwidth until either a preset limit of the first application is reached or the first device detects congestion in the network;
    wherein if the first device detects congestion in the network after exceeding the first application's prescribed bandwidth limit, the first device deducts the additional bandwidth from the first application and returns the first application to its prescribed bandwidth limit;
    wherein after deducting the additional bandwidth from the first application, the first device again allocates additional bandwidth to the first application after a first preset interval; and
    wherein during a second preset interval after deducting the additional bandwidth from the first application, the first device will only allocate additional bandwidth to the first application up to a limit below a point where congestion was detected during the previous allocation of additional bandwidth.

2. The method of claim 1, wherein after the second pre-set interval the first device again allocates, incrementally, additional bandwidth to the first application until either the preset limit is reached or the first device detects congestion in the network.

3. The method of claim 1, wherein the prescribed bandwidth limit is something less than a full bandwidth of the network.

4. The method of claim 1, wherein the first device is a router, and a send function of the router allocates the additional bandwidth.

5. A router configured for routing and forwarding information in a network, the router comprising:
    a plurality of ports, each port being configured to manage a point-to-point connection between itself and another device in the network;
    a processor for executing computer-executable process steps;
    a memory for storing a plurality of applications for sending packets to the network according to an amount of bandwidth allocated to each application, the memory further storing a plurality of parameters for allocating additional bandwidth to each application; and
    a bandwidth scavenging module executed by the processor for allocating, incrementally, the additional bandwidth to a first one of the applications when the first application has a large burst of traffic to send to the network;
    wherein if the router detects congestion in the network after additional bandwidth is allocated to the first application, the bandwidth scavenging module deducts the additional bandwidth from the first application;
    wherein after the additional bandwidth is deducted from the first application, the bandwidth scavenging module may again allocate additional bandwidth to the first application after a first preset interval;
    wherein during a second preset interval after deducting the additional bandwidth from the first application, the bandwidth scavenging module will only allocate additional bandwidth to the first application up to a limit below a point where congestion was detected during the previous allocation of additional bandwidth.

6. The router of claim 5, wherein after the second preset interval the bandwidth scavenging module again allocates, incrementally, additional bandwidth to the first application until either a preset limit is reached or the router detects congestion in the network.

7. A network of devices configured for sending and receiving information, the network comprising:
    a host computing system including a memory for storing computer-executable process steps and a processor for executing the computer-executable process steps; and
    a router configured for routing and forwarding information in the network, including information sent to and from the host system, the router comprising
        a plurality of ports, each port being configured to manage a point-to-point connection between itself and another device in the network;
        a processor for executing computer-executable process steps;
        a memory for storing a plurality of applications for sending packets to the network according to an amount of bandwidth allocated to each application, the memory further for storing a plurality of parameters for allocating additional bandwidth to each application; and
        a bandwidth scavenging module executed by the processor for allocating, incrementally, the additional bandwidth to a first one of the applications when the first application has a large burst of traffic to send to the network;
        wherein if the router detects congestion in the network after additional bandwidth is allocated to the first application, the bandwidth scavenging module deducts the additional bandwidth from the first application;
        wherein after the additional bandwidth is deducted from the first application, the bandwidth scavenging module may again allocate additional bandwidth to the first application after a first preset interval;
        wherein during a second preset interval after deducting the additional bandwidth from the first application, the bandwidth scavenging module will only allocate additional bandwidth to the first application up to a limit below a point where congestion was detected during the previous allocation of additional bandwidth.

8. The network of claim 7, wherein after the second preset interval the bandwidth scavenging module again allocates, incrementally, additional bandwidth to the first application until either a preset limit is reached or the router detects congestion in the network.

* * * * *